United States Patent Office 3,147,243
Patented Sept. 1, 1964

3,147,243
RADIOACTIVE POLYMERS
Gordon D. Brindell, Wayne, N.J., and David W. Marshall, Ponca City, Okla., assignors to Continental Oil Company, Ponca City, Okla., a corporation of Delaware
No Drawing. Filed Aug. 8, 1960, Ser. No. 47,962
6 Claims. (Cl. 260—94.9)

This invention relates to radioactive polymers and process for their preparation. In one aspect, it relates to a method of producing such polymers from unsaturated hydrocarbons, such as olefins and conjugated diolefins, wherein the polymerization reaction is carried out in the presence of radioactive hydrogen.

Radioactive materials have many uses, but perhaps the largest single use of such materials has been confined to the preparation of so-called self-luminescent materials. Many organic and inorganic materials known as phosphors fluoresce under external ionizing radiation; and if the radiation is of sufficient intensity, this fluorescence can be detected visually. In one proposed method, the luminescent particles are activated by means of radioactive beta-ray emitters, namely, radium or isotopes of certain elements such as strontium 90. These materials are characterized by the fact that they emit high energy nuclear radiation which is hazardous to personnel, and for that reason adequate shielding is necessary for safety. Shielding obviously adds to the costs of operation. A further objection to the use of radium activated phosphors is that the luminosity diminishes at a rate of about 30 to 50 percent per year.

In an attempt to overcome the foregoing deficiences, it has been proposed to use tritium (radioactive hydrogen) as a reducing agent wherein the tritium is used specifically to "hydrogenate" alcohols and paraffinic acids. The compounds hydrogenated with tritium in this proposed method are those which, after saturation, form wax-like materials and may be further identified as containing from 12 to 20 carbon atoms per molecule. Obviously the number of tritium atoms added, which in turn is limited by the degree of unsaturation of the original compound, determines the radioactivity of the final compound. Furthermore, the texture of the final compound is a limitation upon its use. In another proposed method, sealed in tritium gas is used to achivee the phosphor. This, of course, is a rather inconvenient method.

It is therefore a prinicpal object of the present invention to provide radioactive polymers.

It is another object of our invention to provide a process for the preparation of radioactive polymers.

Yet another object of this invention is to provide radioactive polymers which can be produced at a relatively low cost.

These and other objects and advantages of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly the foregoing object sand advantages are attained by a process which may be described as follows: A radioactive polymer is prepared by subjecting a monomer to polymerization conditions in the presence of a polymerization catalyst and radioactive hydrogen.

Describing the invention in somewhat greater detail a monomer, specifically an unsaturated hydrocarbon, is mixed with tritium or a mixture of tritium and hydrogen; and then the resultant mixture is added to the polymerization catalyst which is usually suspended in an inert solvent. After the polymerization has proceeded to the desired degree as determined by the amount of polymer formed or until the catalyst has been exhausted, the polymer is recovered.

Before proceeding with specific examples illustrating our invention, it may be well to indicate in general the nature of the material and conditions required in the process.

Tritium is particularly suitable as a radiation source for exciting the phosphor, because of its availability at relatively low cost, and the extremely low penetrating power of the beta radiation therefrom. The latter feature permits the use of the tritium with a minimum of shielding for the safe handling thereof, thus rendering it particularly useful in applications where personnel are likely to be in close contact therewith. On the other hand, if the radiations are to be effective to exicte a phosphor, there must be intimate contact of the tritium with the phosphor.

The catalyst of this invention can be employed generally in the conversion of polymerizable ethylenically unsaturated monomers. These monomers include materials which are well known in the art to be polymerizable in the presence of conventional organometal containing catalysts, including aromatic and aliphatic mono 1-olefins, diene monomers, etc., and admixtures of various polymerizable monomers. Preferably the catalysts are employed in the polymerization of polymerizable 1-olefins, particularly aliphatic 1-olefins containing up to 8 carbon atoms, including materials such as ethylene, propylene, butene, and the like and aromatic 1-olefins, such as styrene, methyl styrene, and the like. The reaction conditions, that is, temperature, pressure time, etc., employed in the polymerization reaction, vary widely depending on the particular monomers used and on the composition of the catalyst. In general, reaction conditions which are well known in the art can be employed and can be varied as required for the particular polymerization system. Usually substantially room temperatures are employed; however it is within the scope of the invention to use temperatures ranging up to as high as 200° C. The reaction pressure is usually somewhat above atmospheric and can vary widely within the limitations of the processing equipment. The reaction time can be varied depending usually on the degree of conversion desired.

The polymerization reaction can be carried out in any suitable manner, that is, in the liquid or gas phase. Generally, it is preferred to carry out the reaction in the presence of a liquid diluent which serves as a carrier for the catalyst, as a heat sink for a polymerization temperature control and as a diluent and sometimes partial solvent for the polymer product. The diluent which is usually a hydrocarbon can be any material ordinarily employed in organometal containing catalyst systems, specifically a paraffin, such as butane, pentane, hexane, heptane, etc., or a cycloparaffin such as cyclohexane, cyclopentane, methylcyclopentane, and the like. Usually the diluent is selected from compounds containing from about 6 to about 12 carbon atoms.

As to the catalyst, a wide range of polymerization catalysts may be used. These include what may be broadly defined as the conventional metal organo-transition metal halide catalysts. It is well known in the art that the various transition metal halides, for example, chlorides, bromides, etc., of the metals of Groups III, IV, V, VI, VII, and VIII of the periodic table are active in the polymerization of ethylenically unsaturated monomers. The halides of the metals of Groups IV–A, V–A, and VI–A are especially active in polymerization, particularly the halides of titanium, zirconium, vanadium, chromium, and molybdenum. Of the latter halides, the more frequently used material and the halide preferred in this invention is titanium tetrachloride.

An important element of the catalyst system is the organometal compound, which can include in general alkyl, cycloalkyl, aryl and alkaryl and aralkyl derivatives of various metals, particularly alkali metals of Group I-A of the periodic table and metals of Groups II–A, II–B, III–A, IV–B, and V–B, including titanium, aluminum, beryllium, zinc, indium, gallium, magnesium, boron, and the like. A preferred group of catalysts include as the organometal component alkali metal alkyl compounds and alkali metal alkaryl compounds. Specific examples of these compounds include materials such as amyl sodium, para-sodio tertiary butyl benzene, octyl sodium, phenyl sodium, butyl sodium, etc. As a rule, of the metal organics, we generally prefer to use either a trialkylaluminum compound or an alkyl alkali metal compound.

A wide variety of specific catalyst systems can be employed and are readily determined by those skilled in the art. Specific examples of typical catalyst systems include compositions such as amyl sodium and titanium tetrachloride, triethylaluminum and zirconium tetrachloride, tetraethyl lead and titanium tetrachloride, octyl sodium and titanium tetrachloride, triethylaluminum and titanium tetrachloride, para-sodio tetrabutyl benzene and zirconium tetrachloride, diethyl zinc and titanium tetrachloride, amyl sodium and zirconium tetrachloride, tetraethyl lead and zirconium tetrachloride, and the like.

The activity of the final polymer product is determined by the number of tritium atoms added to the polymer. If desired, the tritium can be diluted with hydrogen to control the level of radioactivity. An optimum quantity of tritium or hydrogen-tritium mixture varies from about 10 to about 12 mole percent based on the amount of unsaturated hydrocarbon used. If desired, however, the amount of the tritium or tritium-hydrogen mixture may vary from about 1 to about 25 mole percent based on the amount of unsaturated hydrocarbon present.

A large portion of tritium is bound in the polymer. Usually the tritium is incorporated in the polymer in amounts varying from about 1 mole per 25 moles of monomer to about 1 mole per 11 moles of monomer. The amount of combined tritium is greater by a factor of 500 than the amount required merely for termination of the polymer chain. It appears that the reaction follows an exchange mechanism with the tritium atoms replacing hydrogen atoms on the monomer molecules.

Specific advantages of our invention are as follows:

(1) Tritium is readily available from the AEC at relatively low cost per curie of radioactivity ($2 per curie).

(2) Tritium is safer and easier to handle than carbon-14.

(3) No presynthesis of radioactive unsaturated hydrocarbon is necessary.

(4) The level of radioactivity in the finished polymer can be easily adjusted by the quantity of tritium mixed with unsaturated hydrocarbon and hydrogen in making up the charge gas.

(5) Any alpha-olefin or conjugated diolefin may form a radioactive polymer by this procedure.

In order to disclose the nature of the present invention still more clearly, the following illustrative examples will be given. It is to be understood that the invention is not to be limited to the specific conditions or details set forth in these examples except in so far as such limitations are specified in the appended claims.

*Example 1*

A mixture of ethylene, hydrogen, and tritium (10 millicuries) was prepared in a metal cylinder by charging first a hydrogen-tritium mixture to 3 atmospheres pressure and then pressuring with ethylene from another cylinder to 500 p.s.i.g. Mass spectrum analysis showed this gas mixture to contain 8.7 mole of hydrogen. Its activity was found to be $3.54 \times 10^{10}$ disintegrations/minute per gram of hydrogen.

A polymerization catalyst was prepared by reacting 0.03 mole of n-amyl sodium and 0.005 mole of $TiCl_4$ in 500 ml. of dry n-hexane. The charge gas described above was pressured into a 1-qt. beverage bottle containing the catalyst and hexane. Polymerization began immediately and was continued until 11 g. of polymer were produced. The polymer was separated from the reaction solvent and subsequent washed twice in a Waring Blendor with methyl alcohol. A further treatment to remove catalyst consisted of a 16-hour treatment with 5 percent $H_2SO_4$ in a methanol-water mixture at the reflux temperature. The polymer was washed free of acid and dried in a vacuum oven. The dry polymer weighed 11 grams. Counting showed that roughly 45 percent of the radioactivity contained in the gas charged ended up in the polymer.

*Example 2*

Polymerization was carried out exactly as described in Example 1 using the same catalyst quantities and the same gaseous mixture of ethylene, hydrogen, and tritium. A total of 20 grams of gas was charged in several pressurings. The dry polymer weighed 19.5 grams. Counting showed that about 67 percent of the radioactivity contained in the 20 grams of gas ended up in the polymer.

*Example 3*

Polymerization was carried out as described in Example 1 above using the same catalyst and solvent quantities and the same gaseous mixture of ethylene, hydrogen, and tritium. A total of 31.5 grams of gas was charged in several pressurings. The dry polymer weighed 31.5 grams. Counting showed that roughly 82 percent of the radioactivity contained in the gas ended up in the polyethylene. This polyethylene was recrystallized from p-xylene with essentially complete retention of its radioactivity.

*Example 4*

A polymerization catalyst was prepared by mixing 0.025 mole $AlEt_3$ and 0.005 mole of $TiCl_4$ in 500 ml. of dry n-hexane in a one-quart beverage bottle. The bottle and catalyst were pressured a total of four times with the same ethylene, hydrogen, and tritium mixture that was used in the first three examples. The bottle gained 18 grams in weight. The polymer was filtered without deactivation with methanol and subsequently washed twice in a Waring Blendor with methanol. The dry polymer weighed 17 grams. Counting showed that 12 percent of the radioactivity contained in the charge gas ended up in the polyethylene.

The products of this invention are useful where a constant source of beta radioactivity is required, such as counting standards and tracer applications. The polymers can be formed into a variety of shapes and thin films by known techniques. Obviously the products of this invention can also be blended with other plastic materials with which they are compatible for further applications.

When it is desired to prepare a self-luminescent material such as a film, a phosphor is incorporated in the polymer. Suitable phosphors are enumerated in U.S. Patents 2,402,757; 2,402,759; 2,505,621; 2,534,562; 2,749,251; and 2,908,588 which disclosures are hereby made a part of this application.

While particular embodiments of the invention have been described, it will be understood, of course, that the invention is not limited thereto since many modifications may be made; and it is therefore contemplated to cover by the appended claims any such modifications as fall within the true spirit and scope of the invention.

We accordingly claim:

1. A process for preparing a radioactive polymer which comprises catalytically polymerizing ethylene at a temperature between about 25° and 200° C. in the presence of from about 1–25 mole percent tritium based on the ethylene wherein the catalyst is an organometal-transition metal halide catalyst system.

2. A process for preparing a radioactive polymer which comprises catalytically polymerizing ethylene at a temperature between about 25° and 200° C. in the presence of from about 10–12 mole percent tritium based on the ethylene wherein the catalyst is an organometal-transition metal halide catalyst system.

3. A process for preparing a radioactive polymer which comprises catalytically polymerizing ethylene at a temperature between about 25° and 200° C. in the presence of from about 1–25 mole percent tritium based on the ethylene wherein the catalyst is a triethylaluminum-titanium tetrachloride catalyst system.

4. A process for preparing a radioactive polymer which comprises catalytically polymerizing ethylene at a temperature between about 25° and 200° C. in the presence of from about 10–12 mole percent tritium based on the ethylene wherein the catalyst is a triethylaluminum-titanium tetrachloride catalyst system.

5. A process for preparing a radioactive polymer which comprises catalytically polymerizing ethylene at a temperature between about 25° and 200° C. in the presence of from about 1–25 mole percent tritium based on the ethylene wherein the catalyst is an n-amyl sodium-titanium tetrachloride catalyst system.

6. A process for preparing a radioactive polymer which comprises catalytically polymerizing ethylene at a temperature between about 25° and 200° C. in the presence of from about 10–12 mole percent tritium based on the ethylene wherein the catalyst is an n-amyl sodium-titanium tetrachloride catalyst system.

References Cited in the file of this patent
UNITED STATES PATENTS 3,033,797    De Leo et al. _____ May 8, 1962

FOREIGN PATENTS 807,204    Great Britain _____ Jan. 7, 1959

OTHER REFERENCES

Murray et al.: Organic Synthesis With Isotopes. New York (1958), Interscience, Part II, pp. 1420, 1682, 1683, 1706.

Proceedings of the International Conference on the Peaceful Uses of Atomic Energy, United Nations Publication, vol. 15, 1956. Pages 307–308 relied on.

Moeller: Inorganic Chemistry (1957), John Wiley & Sons, N.Y. Pages 387 and 395.

Natta et al.: La Chimica e l'Industria, vol. 39, September 1957. Pages 733–743, page 741 only needed.